Dec. 8, 1970  W. CHILDERS  3,545,858
PHOTOGRAPHIC TIMING APPARATUS RESPONSIVE TO OPTICAL DENSITY
Filed March 11, 1968
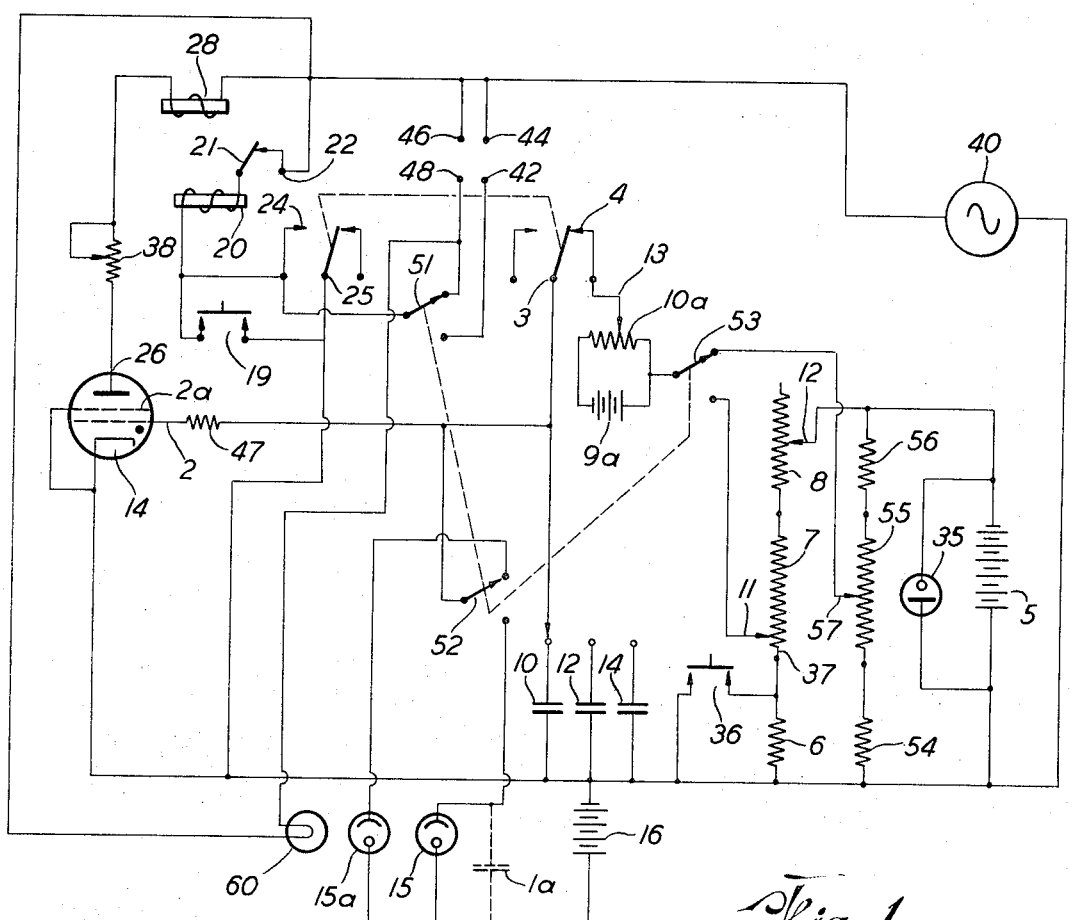
Fig. 1
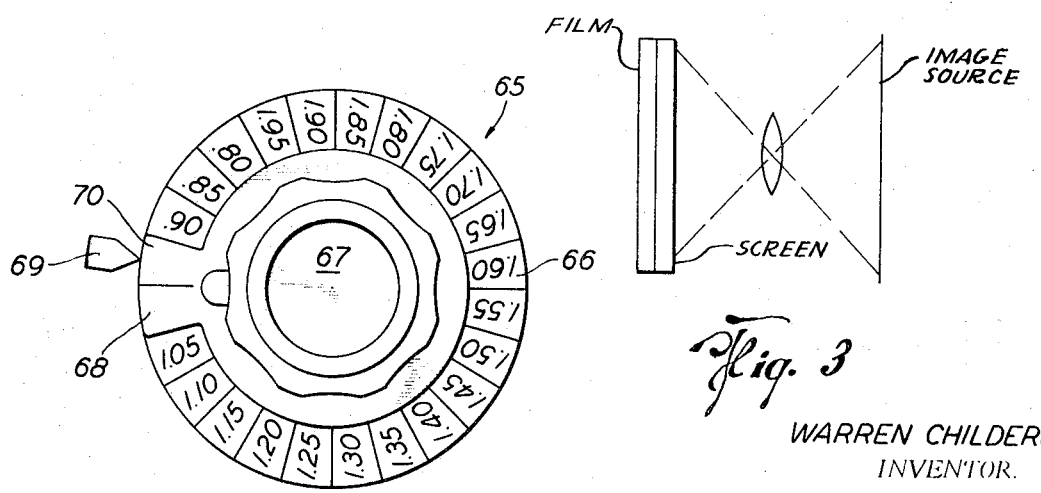
Fig. 2
Fig. 3
WARREN CHILDERS
INVENTOR.
BY Donald Gunn
ATTORNEY

United States Patent Office 3,545,858
Patented Dec. 8, 1970

3,545,858
PHOTOGRAPHIC TIMING APPARATUS RESPONSIVE TO OPTICAL DENSITY
Warren Childers, 2518 South Blvd.,
Houston, Tex. 77006
Filed Mar. 11, 1968, Ser. No. 712,020
Int. Cl. G03b 27/76
U.S. Cl. 355—68       15 Claims

ABSTRACT OF THE DISCLOSURE

In preparing a halftone, the optical density range of the image may exceed the optical density range of the halftone screen. The apparatus controls the exposure of the film dependent on the excess optical density. The excess optical density is set into the apparatus and an RC timing circuit controls firing of a thyratron to turn on the lamp. A photocell measures the light falling on the film. The RC circuit discharges, as detected by the thyratron, which terminates the exposure when the photocell has viewed a measured amount of light.

SUMMARY OF PROBLEM AND SOLUTION

Many image sources are delivered to a reproduction facility in which the image source, either black and white, or in color, is a continuous tone. For many reproduction processes, it is necessary to convert the continuous tone image to an image formed of a plurality of dots on regular spacing, but which vary in size from tiny dots to the extent that they may overlap and form a uniform tonal area. The use of the dot pattern or representation relies on the fact that the eye is unable to resolve individual dots and therefore the dot pattern image has the appearance of a quality reproduction.

The materials used in photographic processing have different ranges of optical density for which compensation is sometimes needed. For instance, the image source, when measured by a densitometer may have densities of .15 to 1.65, by way of example. The range of optical density from the darkest to lightest portions of the image source is therefore 1.5 as measured by the densitometer. On the other hand, the optical screen for converting the continuous tone to dots may have a working density range of 1.0; from the example, it will be appreciated that it is difficult to match the screen to the source. To obtain the most desirable reproduction, the current practice is to match the highlights of the image source and the optical screen and ignore the excess density range of the image (the shadow tones). This, in fact, is often the practice.

The continuous tone image has heretofore been projected through the screen and onto the process film. The range of excess density of the copy source has heretofore been ignored to the extent that the shadow tones and darker portions of the copy source have been compressed and the range of contrast has therefore been limited with the loss of detail in the half tone image.

One previously used technique for transferring some contrast in the shadow tones, the tones normally lost when the density range of the continuous tone image exceeds the working range of the half tone screen, has involved the use of a supplemental flash so as to obtain at least a slight exposure in the darker portions of the image source. Heretofore, an auxiliary exposure of the film, with only the screen and no copy source, has approximately overcome the threshold of light energy required to barely or slightly expose the film with the hope that the shadow tones will yield some tonal shadow and the light energy required would not be used in only overcoming film inertia. Typically, this is described as flashing, although it is to be distinguished from a flash bulb or other such unit. The auxiliary exposure, coupled with the light energy from the copy source passed through the half tone screen (even for the darkest areas of copy) yields just enough light energy in the darker portions of the image to slightly form shadow tone dots in the half tone pattern. In effect, the darker and less important tones having a stated range of excess optical densities are slightly compressed in the foregoing technique.

Precise control of the flashing exposure is critical to preserve quality of the reproduction. An excess of flashing light energy washes out the contrast of the image while a deficiency of flashing energy leaves harsh and generally uniform shadow areas which are generally unpleasing to the eye.

With the foregoing problem in view, the device of the present invention is directed to provision of means for controlling proper auxiliary and main exposure, which is responsive to the difference in copy density range, and the working range of the half tone screen. The present invention is summarized as providing an exposure and flashing control wherein the auxiliary exposure of the film takes into consideration the variations in the source copy density and the density range of the half tone screen. Further, the device incorporates means taking into consideration fluctuations in line voltage and provides compensation therefor, it being understood that fluctuations as small as one percent in line voltage cause light output fluctuations of perhaps five percent or greater.

One object of the present invention is to provide electronic means of new and improved construction for achieving correct and accurate auxiliary flashing and exposure based on the copy density range and the working range of the half tone screen, both factors being subject to wide variations.

Another object of the present invention is to provide a control circuit for use in photographic exposures which compensates for fluctuations in line voltage which materially alter the light energy emitted from the exposure light source.

An important object of the present invention is to provide a new and improved control device which requires no skill in operation wherein adjustments to obtain the proper auxiliary flashing and exposure wherein such variables as density range of the copy image and working range of the half tone screen are easily set into the apparatus.

Yet another object of the present invention is to provide a new and improved control for exposure of photographic images through a variety of half tone screens in which no calculations are required of the operator.

Other objects and advantages of the present invention will become more readily apparent from a consideration of the included specification and drawings, wherein:

FIG. 1 is a schematic wiring diagram of the present invention;

FIG. 2 is a face view of a suitable dial arrangement enabling an unskilled operator to adjust the present invention; and FIG. 3 is a simplified diagram showing the relationship of an image source, a half-tone screen, and a photographic medium wherein an image is formed on the medium.

Attention is first directed to FIG. 1 of the drawings which illustrates in schematic wiring detail the circuitry of one embodiment of the present invention. In FIG. 1, a voltage source 40 such as the commercial power supplied at either 50 or 60 hertz, having a nominal value of 110 volts AC supplies the present apparatus. The present apparatus incorporates control means for determining the interval of operation of the main light source and the auxiliary light source. By main light source, reference is made to the light source which transfers light from the image source through the selected screen and onto the photographic film or other material which responds to the light energy falling thereon. Connections at 42 and 44 are provided for the main light source, it being appreciated that such units are well known in the art. For the auxiliary of flashing light source, particularly useful in exposing film with a calculated amount of light energy, just sufficient to overcome the inertia of the film, the terminals 46 and 48 connect to the auxiliary or flashing light unit, a device well known in the art.

Broadly, the present invention provides a timing means which controls the interval during which a control signal is furnished to the two pair of terminals. The timing means is initiated in operation by temporary closure of a switch means 19 resulting in the following changes. An RC timing circiut including one of a selected plurality of capacitors represented at 10, 12 and 14 and having a discharge path through either of the photocells 15 or 15a and series voltage source 16 is charged from a constant current source including the battery 9 and circuitry to be described. The battery 9 is not connected to ground but rather is connected to a plurality of precision voltage dividers, which quite accurately control the end point of the charging curve to thereby limit the level to which the RC circuit is charged. When the battery 9 is disconnected from the RC circuit, the charge on the selected capacitor is bled to ground through the selected photo cell and the battery 16. The discharge is input through a grid resistor 47 to a thyratron 2 which responds to the variations in voltage at its grid to form a timed output signal. The timing sequence starts on closure of the switch 19 and terminates on bleeding of the charge on the selected capacitor to a level where thyratron becomes conductive, the interval being determined quite precisely in accordance with operation of the present invention to thereby time the control signal at the selected output terminals for the main or auxiliary light sources, it being appreciated that the light energy falling on the copy is generally proportionally related to the interval that the light source is turned on.

Considering the present invention more in detail, attention is first directed to the circuitry associated with the thyration 2. The thyration 2 incorporates a conventional suppressor grid 2a, cathode 14 and plate 26. A suitable plate load resistor 38 which is made adjustable for determining optimum current is likewise communicated to the coil or winding of a relay indicated by the numeral 28. The hot lead from the voltage source 40 is communicated to the winding 28 which is energized only when the thyratron 2 conducts.

A control relay indicated by the numeral 20 is provided with operating current through the normally contacted relay terminals 21 and 22 controlled by the relay 28. The relay 20 is made self latching when the contacts 24 and 25 are closed on its own actuation, it being appreciated that the start switch 19 is wired across the contacts 24 and 25. A suitable path to ground is provided.

Attention is next directed to the charging or current source for the RC timing circuit previously noted. Attention is directed to normally closed contacts 3 and 4 operated by the relay 20 which communicate the wiper arm 13 of a variable resistor 10a connected across the terminals of the voltage source 9. The voltage source 9 is provided with an adjustable reference voltage to ground, and thereby serves as a floating constant current charging source for the RC timing circuit above noted. More will be noted concerning the selection of the two voltage dividers hereinafter.

As previously noted, the device of the present invention is adapted for control of either the main or auxiliary light sources. Attention is directed to a ganged switch means indicated by the numerals 51, 52 and 53. Each switch is a single pole, double throw switch. Briefly, the switch 51 selects one of the two output terminal sets for the two light sources. The switch 52 selects the photocells 15 or 15a, the photocell 15 being associated with the main light exposure and the photocell 15a being associated with the auxiliary light exposure. The switch 53 selects one of two voltage dividers, one voltage divider determining sufficient light from the main light source to match the optical density range of the selected screen to the highlights of the image source, and the other voltage divider being associated with the auxiliary light source to control the auxiliary or flashing light falling on the process film which achieves the condensation of the darker tones of the continuous tone image, this being accomplished in spite of the fact that the optical density range of the screen seldom, if ever, matches the optical density range of the image source.

In the illustrated position, the switches 51, 52 and 53 prepare the circuitry for operation of the auxiliary light source.

A voltage source 5 and a parallel voltage regulator 35 accurately control voltages across the voltage dividers to be described. One divider incorporates series resistors 6, 7 and 8, with end point control being furnished at the wiper arm 12 of the variable resistor 8 while the resistor 6 is paralleled by a calibration push button switch 36. The resistor 7 is preferably divided into a number of finite increments which are selected by the slider 11 which then communicates through the switch 53 to the constant current charging source for the RC timing circuit. Preferably, the resistors 7 and 8 are calibrated to indicate photographic density. By way of example, the resistor 7 is preferably calibrated in increments of .10 of optical density. Resistor 12 is calibrated in increments of .01 optical density. Adjustment of the movable contacts 11 and 12 thereby inputs the highlight optical density to the present apparatus. If the highlight optical density is .22, both controls 11 and 12 are moved to input this data to the RC charging circuit.

Adjustment of the slidable contacts 11 and 12 is meaningful only if the voltage divider is appropriately calibrated with respect to the remainder of the apparatus. For this purpose, the switch 36 is closed to short the resistor 6. The sliding contact 11 is moved to the terminal 37 which, in effect, grounds the slider 11. The adjustable terminal 13 of the rheostat 10a is then moved to place a more negative voltage on the grid of the thyratron 2. Since the source 9 is connected to provide a range of negative voltages, a less negative voltage approaches the critical firing voltage of the thyratron. When the thyratron fires, the relays 20 and 28 operate as will be described. Since an alternating current source is connected to the thyratron 2, conduction is extinguished every half cycle and the thyratron is re-ignited on succeeding positive half cycles only so long as the grid voltage is at or exceeds the critical firing voltage. Calibration of the present device is obtained as the rheostat 10a is adjusted, and upon achieving the critical firing voltage, a buzz at the line voltage frequency is heard as the relay 28 opens and closes at that frequency. This then determines the critical firing voltage, which adjustment is preferably left unchanged for an extensive interval of time since firing characteristics of the thyratrons seldom change. At this juncture, the calibration switch 36 is opened and a point representing optical density of 0.00 has been determined for the voltage divider including the resistors 7 and 8, it being appreciated that all adjustments thereafter are in reference to the zero setting and range upward as determined by the highlight optical density.

The second resistive divider circuit incorporates the series resistors 54, 55 and 56. A selector 57 is moved to one of several calibrated positions of the precision resistor 55. While more will be noted hereinafter concerning the nature of the calibrations, the resistor 55 furnishes a calculated voltage through the selector 57 for controlling the interval of the auxiliary flash.

An additional component included in the schematic of FIG. 1 is the lamp 60 which is connected between the power lines of the source 40. The lamp 60 is positioned in near proximity to the photocell 15 to impinge thereon in the manner such that fluctuations in line voltage alter the light output and the terminal resistance of the photocell 15a. Variations in line voltage as little as one percent may produce variations as much as five percent in the quantity of light output. For this reason, the photocell 15a is included and its terminal resistance is varied inversely to line voltage so that the quantity of light obtained from the flashing source is unaltered by the line fluctuations.

Attention is next directed to FIG. 2 of the drawings which illustrates a control 65 which eliminates complicated calculations in setting optical density range into the present apparatus. The control 65 is adapted to move the wiper arm 57 of the voltage divider used in the flashing or auxiliary exposure. By way of contrast, the single control 65 is preferable compared to the decade capacitors 10, 11 and 14 which provide a range of 1,000 arbitrary units in setting in the main exposure time-light energy integral.

As mentioned hereinbefore, the variable resistor 55 is preferably a series of precision resistors selected by a rotatable switch mechanism. Since the nature of the switch mechanism is well known, it is not shown in FIG. 2 wherein the control for the switch mechanism is illustrated.

In the use of the present apparatus, and assuming a copy source which requires both a main exposure and a flashing exposure, the minimum measure of optical density is set in by operation of the sliders or selectors 11 and 12. The device preferably adjusts resistors 7 and 8 to provide for increments of 0.10 and 0.01 unit of optical density. This yields a set point which matches the highlight optical density of the image source. In other words, the end points of thes two ranges of measure are, so to speak, matched to one another.

The dial 66 is rotated with respect to the knob 67. The dial 66 is preferably mounted on the common shaft for the control knob 67 by a friction collar or other suitable means whereby the knob 67 remains stationary while the dial 66 is rotated. The dial is rotated until the number representing the optical density range of the screen is positioned below the tab 68, a tab fixedly attached to the knob 67. At this juncture, it will be appreciated that the potentiometer 55 has not been adjusted by movement of the wiper arm 57 shown in FIG. 1, the foregoing movement merely setting in a relative number as will be used hereafter.

The knob 67 is next rotated until a pointer 69 fixed with respect to the knob 67 is opposite the number describing the optical density range of the selected image source. Thus, the distance between the tab 68, over the optical density range of the screen, and the pointer 69 opposite the optical density range of the selected image source is a measure of the excess optical density range of the copy over the screen. This quantity is converted to a voltage by the resistor 55 and the associated wiper arm 57 (see FIG. 1) with the commensurate result that the bias level voltage for operation of the thyratron 2 is selected and the timing interval of the RC timing circuit described hereinbefore is altered. In operation, the voltage provided to the control grid of the thyratron 2 is altered upwardly or downwardly in response to the control function herein described.

Preferably, the relationship of the various tabs of the resistor 55 is as follows:

$$1.0 - \frac{1.0}{A}$$

wherein A is antilog of the optical density range. By way of example, an excess optical density of 0.05, having an antilog of 1.122 yields 0.10874. In percentage terms, the flashing exposure provides 10.874% of the shadow exposure of the photographic medium.

FIG. 2 includes a second tab 70 which is preferably labeled "flash test." When the tab 68 is positioned over the number representing the optical density range of the image source, rotation of the knob 67 to position the tab 70 opposite the pointer 69 applies maximum voltage from the resistor 55 to the wiper arm 57. Its maximum value is used as a flash test exposure, a calibration standard, if desired.

Reviewing operation of the present invention, and placing the various controls in perspective in relation to photographic copy, it should be noted that the decade capacitors 10, 12 and 14 preferably describe decade step apparatus having a range from zero to nine hundred ninety-nine arbitrary units. Routinely, the operator of the apparatus determines a number which is set into the adjustable capacitor and which varies with brands or grades of photographic film and the like. For a given film and circumstances of exposure, the measure is normally constant. The resistor 10a selects the critical bias voltage at which the firing of the thyratron 2 is withheld and should not vary except with aging of the tube. Moreover, the resistors 7 and 8 are varied to set in the minimum measure of optical density of the image source. By way of example, should the optical density of the image source be 0.30, the time of exposure with a selected reading at the capacitors 10, 12 and 14 might be twenty seconds. Should the resistors be adjusted to a reading of 0.60, the time of exposure doubles to forty seconds. On the other hand, should the reading be adjusted to 0.00, the time of exposure is ten seconds. In the three above examples, it was assumed that the photocell 15 detected no change in level of output of the various light sources for the photographic medium.

The third major control is the flashing control apparatus discussed hereinabove in detail. It cooperates with the present apparatus in forming the flashing control signal also described herein.

While the foregoing describes the preferred embodiment of the present invention, many variations may be adapted thereto by one skilled in the art, whereas the scope of the present invention is determined by the claims appended hereto.

What is claimed is:

1. For use with apparatus forming a halftone image on a photographic medium from an image source having maximum and minimum optical densities and wherein a selected screen having a known optical density range is used in cooperation with the photographic medium, an apparatus for controlling the excess density light energy falling on the photographic medium and passing through the selected screen comprising means responsive to the excess optical density range of the image source as an input thereto for at least partially controlling the light energy falling on the photographic medium for exposing the photographic medium.

2. The invention of claim 1 including means for controlling the light energy passing through the selected screen and exposing the photographic medium such that the highlights of the image source are matched to the highlight optical density of the selected screen.

3. The invention of claim 1 including means for controlling the light energy passing through the selected screen and exposing the photographic medium wherein the excess optical density range of the image source falls without the optical density range of the selected screen at the shadow tone thereof.

4. The invention of claim 1 including timing circuit means responsive to supply voltage fluctuations such that timing of said timing circuit means is altered to extend and shorten the duration of the excess density light energy in a manner to compensate for light energy variations of the light energy source.

5. The invention of claim 1 including:
 (a) RC circuit means;
 (b) current source means for charging said RC circuit means;
 (c) a resistive discharge path adapted to be connected to said RC circuit means after operation of said current source means;
 (d) bias level means for controlling a voltage level operative with said current source means; and
 (e) said bias level means being responsive to the optical density of the selected screen.

6. The invention of claim 1 including a timing circuit means responsive to a function selected by the operator, and wherein said means responsive to the excess optical density range cooperates with said timing circuit means to alter the timing thereof.

7. The invention of claim 1 including a timing circuit means responsive to a function selected by the operator, said means controlling the light energy of the main exposure of the photographic medium to the image from the image source.

8. The invention of claim 1 including:
 (a) RC timing circuit means;
 (b) light energy responsive means incorporated in said timing circuit means for controlling the rate of operation, said means adapted to be positioned to measure light energy exposing the photographic medium; and
 (c) control means for setting said timing circuit means in response to an operator's function.

9. The invention of claim 1 including:
 (a) RC timing circuit means;
 (b) means measuring light energy from a standard light energy source means operated by the voltage source of the illumination means of the photographic medium; and
 (c) control means for setting said timing circuit means in response to an operator's function.

10. The invention of claim 1 including timing circuit means responsive to the antilog of the excess optical density range.

11. The invention of claim 1 incorporating:
 (a) voltage level responsive means having a conductive and non-conductive condition;
 (b) RC timing circuit means for controlling said voltage level responsive means;
 (c) bias level means for setting a point of operation of said voltage level responsive means; and
 (d) control means for adjusting said timing circuit means in response to an operator function.

12. The invention of claim 11 including a thyratron having a control grid connected to said bias level means which maintains said thyratron in a quiescent condition.

13. The invention of claim 12 wherein said timing circuit means is connected to said control grid to alter the conductive condition of said thyratron on operation of said timing circuit means.

14. The invention of claim 11 including audible means indicating operation of said voltage level responsive means.

15. The invention of claim 11 wherein said means is responsive to the antilog of the excess optical density range.

References Cited

UNITED STATES PATENTS

| | | | |
|---|---|---|---|
| 3,220,330 | 11/1965 | Roos | 355—68 |
| 3,249,000 | 5/1966 | Pack | 355—68 |
| 3,397,611 | 8/1968 | Davies | 355—69X |
| 3,455,632 | 7/1969 | Neale et al. | 355—68X |

FOREIGN PATENTS 1,186,317  1/1965  Germany.

NORTON ANSHER, Primary Examiner

M. D. HARRIS, Assistant Examiner

U.S. Cl. X.R.

355—69